United States Patent
Kwon et al.

(10) Patent No.: US 10,863,527 B2
(45) Date of Patent: Dec. 8, 2020

(54) SYSTEM AND METHOD FOR HARQ ACKNOWLEDGEMENT

(71) Applicant: Futurewei Technologies, Inc., Plano, TX (US)

(72) Inventors: Young Hoon Kwon, Laguna Niguel, CA (US); Pengfei Xia, San Diego, CA (US); Bin Liu, San Diego, CA (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 15/901,055

(22) Filed: Feb. 21, 2018

(65) Prior Publication Data

US 2019/0075573 A1 Mar. 7, 2019

Related U.S. Application Data

(60) Provisional application No. 62/555,178, filed on Sep. 7, 2017.

(51) Int. Cl.
*H04W 72/12* (2009.01)
*H04L 1/18* (2006.01)
*H04W 72/04* (2009.01)
*H04W 88/08* (2009.01)
*H04W 88/02* (2009.01)

(52) U.S. Cl.
CPC ......... *H04W 72/12* (2013.01); *H04L 1/1812* (2013.01); *H04L 1/1854* (2013.01); *H04W 72/046* (2013.01); *H04W 72/0413* (2013.01); *H04W 72/1289* (2013.01); *H04W 88/02* (2013.01); *H04W 88/08* (2013.01)

(58) Field of Classification Search
CPC . H04W 36/06; H04W 36/0055; H04W 36/18; H04W 40/12; H04W 72/046; H04W 36/14; H04B 7/0695; H04B 7/0408; H04B 7/088; H04B 7/0632; H04B 17/318; H04L 5/0055; H04L 1/1854; H04L 1/1887; H04L 1/1864; H04L 1/1896
See application file for complete search history.

(56) References Cited

U.S. PATENT DOCUMENTS

| | | | |
|---|---|---|---|
| 2008/0002688 A1* | 1/2008 | Kim | H04L 1/1812 370/389 |
| 2017/0063509 A1* | 3/2017 | Kim | H04L 5/0055 |

FOREIGN PATENT DOCUMENTS

| | | |
|---|---|---|
| CN | 101174878 A | 5/2008 |
| WO | 2017024516 A1 | 2/2017 |

OTHER PUBLICATIONS

CATT, "Discussion on beam recovery," 3GPP TSG RAN WG1 AH_NR Meeting, R1-1700225, Spokane, USA, Jan. 16-20, 2017, 3 pages.

CATT, "Considerations on beam recovery mechanism," 3GPP TSG RAN WG1 Meeting #88, R1-1702078, Athens, Greece, Feb. 13-17, 2017, 4 pages.

\* cited by examiner

*Primary Examiner* — Elton Williams
(74) *Attorney, Agent, or Firm* — Slater Matsil, LLP (57) ABSTRACT

According to one aspect of the present disclosure, there is provided a method that includes: transmitting, by a base station, scheduling information for a first uplink transmission to a user equipment with a first beam; receiving, by the base station, a first transmission of the first uplink transmission from the user equipment; and modifying, by the base station, transmission of an acknowledgment for the first uplink transmission in response to receiving an indication from the user equipment that the first beam has failed.

20 Claims, 9 Drawing Sheets

SYSTEM AND METHOD FOR HARQ ACKNOWLEDGEMENT

This patent application claims priority to U.S. Provisional Application No. 62/555,178, filed on Sep. 7, 2017, and entitled "System and Method for HARQ Acknowledgement," which is hereby incorporated by reference herein as if reproduced in its entirety.

TECHNICAL FIELD

The present disclosure relates generally to a system and method for hybrid automatic repeat request (HARQ), and, in particular embodiments, to a system and method for HARQ acknowledgement.

BACKGROUND

One possible deployment scenario for fifth generation (5G) New Radio (NR) system architecture uses high frequency (HF) operating frequencies (e.g., 6 gigahertz (GHz) and above, such as millimeter wavelength (mmWave)) to exploit greater available bandwidth and less interference than what is available at lower frequencies, which may be congested. However, high pathloss is an issue at HF operating frequencies. Beamforming may be used to overcome high pathloss. Under certain conditions, a user equipment (UE) device may detect that existing communications beam between a next generation (NG) NodeB (gNB) and the UE is not working as expected (e.g., there is a beam failure and/or loss) and there is a need to recover from this condition. In order to recover from the beam failure, the UE transmits a beam failure recovery request (BFRR) to the gNB.

Hybrid automatic repeat request (HARQ) is a technique used in a network that allows a transmitting device to retransmit a packet if a receiving device fails to decode the packet. In general, the transmitting device applies a cyclic redundancy check (CRC) code to the transmission at a transport layer and transmits the packet in a Physical Downlink Shared Channel (PDSCH) or a Physical Uplink Shared Channel (PUSCH). The receiving device sends back an acknowledgement (ACK) if a CRC check passes after it decodes the packet or a negative acknowledgement (NACK) if the CRC check fails. Typically, the transmitting device retransmits the packet if it receives a NACK. However, if the transmission path between the UE and gNB has failed (e.g., beam failure, loss, or blockage), HARQ ACKs/NACKs may not be received by the UE.

SUMMARY

According to one aspect of the present disclosure, there is provided a method that includes: transmitting, by a base station, scheduling information for a first uplink transmission to a user equipment with a first beam; receiving, by the base station, a first transmission of the first uplink transmission from the user equipment; and modifying, by the base station, transmission of an acknowledgment for the first uplink transmission in response to receiving an indication from the user equipment that the first beam has failed.

Optionally, in any of the preceding aspects, another implementation of the aspect provides that modifying the transmission of the acknowledgment includes: cancelling, by the base station, transmission of the acknowledgment to the user equipment. Optionally, in any of the preceding aspects, another implementation of the aspect provides that modifying the transmission of the acknowledgment includes: delaying, by the base station, transmission of the acknowledgment to the user equipment. Optionally, in any of the preceding aspects, another implementation of the aspect provides that the method further includes: transmitting, by the base station, the acknowledgment to the user equipment with a second beam.

According to one aspect of the present disclosure, there is provided a method that includes: transmitting, by a base station, scheduling information for a first uplink transmission to a user equipment with a first beam, the first uplink transmission scheduled at a first scheduled time; receiving, by the base station, a first transmission of the first uplink transmission from the user equipment at the first scheduled time; scheduling, by the base station, an acknowledgment for the first uplink transmission at a second scheduled time, the second scheduled time being a predetermined amount of time after receiving the first uplink transmission; receiving, by the base station, an indication from the user equipment that a transmission path for the first beam between the base station and the user equipment is blocked, the indication received before the second scheduled time; and based on the received indication, cancelling, by the base station, transmission of the acknowledgment for the first uplink transmission.

Optionally, in any of the preceding aspects, another implementation of the aspect provides that the method further includes: transmitting, by the base station, scheduling information for a second uplink transmission to the user equipment with a second beam, the second uplink transmission being a follow-up transmission for the first uplink transmission; receiving, by the base station, a first transmission of the second uplink transmission from the user equipment; scheduling, by the base station, an acknowledgment for the second uplink transmission; and transmitting, by the base station, the acknowledgment for the second uplink transmission to the user equipment with the second beam. Optionally, in any of the preceding aspects, another implementation of the aspect provides that the scheduling information for the first uplink transmission is transmitted using a first control channel, and the scheduling information for the second uplink transmission is transmitted using a second control channel. Optionally, in any of the preceding aspects, another implementation of the aspect provides that the indication includes an index for the second beam. Optionally, in any of the preceding aspects, another implementation of the aspect provides that the first uplink transmission is a hybrid automatic repeat request (HARQ) uplink transmission.

According to one aspect of the present disclosure, there is provided a method that includes: transmitting, by a base station, scheduling information for a first uplink transmission to a user equipment with a first beam, the first uplink transmission scheduled at a first scheduled time; receiving, by the base station, a first transmission of the first uplink transmission from the user equipment at the first scheduled time; scheduling, by the base station, an acknowledgment for the first uplink transmission at a second scheduled time, the second scheduled time being a first predetermined amount of time after receiving the first uplink transmission; receiving, by the base station, an indication from the user equipment that a transmission path for the first beam between the base station and the user equipment is blocked, the indication received before the second scheduled time; based on the received indication, waiting, by the base station, until the second scheduled time; and after the second scheduled time, transmitting, by the base station, the acknowledgment to the user equipment with a second beam.

Optionally, in any of the preceding aspects, another implementation of the aspect provides that the acknowledgment is transmitted to the user equipment within a second predetermined amount of time after the second scheduled time. Optionally, in any of the preceding aspects, another implementation of the aspect provides that the indication includes an index for the second beam. Optionally, in any of the preceding aspects, another implementation of the aspect provides that the first uplink transmission is a hybrid automatic repeat request (HARQ) uplink transmission.

According to one aspect of the present disclosure, there is provided a base station that includes: a processor; and a non-transitory computer readable storage medium storing programming for execution by the processor, the programming including instructions for: transmitting scheduling information for a first uplink transmission to a user equipment with a first beam; receiving a first transmission of the first uplink transmission from the user equipment; and modifying transmission of an acknowledgment for the first uplink transmission in response to receiving an indication from the user equipment that the first beam has failed.

Optionally, in any of the preceding aspects, another implementation of the aspect provides that modifying the transmission of the acknowledgment includes: cancelling transmission of the acknowledgment to the user equipment. Optionally, in any of the preceding aspects, another implementation of the aspect provides that modifying the transmission of the acknowledgment includes: delaying transmission of the acknowledgment to the user equipment. Optionally, in any of the preceding aspects, another implementation of the aspect provides that the programming further includes instructions for: transmitting the acknowledgment to the user equipment with a second beam.

According to one aspect of the present disclosure, there is provided a base station that includes: a processor; and a non-transitory computer readable storage medium storing programming for execution by the processor, the programming including instructions for: transmitting scheduling information for a first uplink transmission to a user equipment with a first beam, the first uplink transmission scheduled at a first scheduled time; receiving a first transmission of the first uplink transmission from the user equipment at the first scheduled time; scheduling an acknowledgment for the first uplink transmission at a second scheduled time, the second scheduled time being a predetermined amount of time after receiving the first uplink transmission; receiving an indication from the user equipment that a transmission path for the first beam between the base station and the user equipment is blocked, the indication received before the second scheduled time; and based on the received indication, cancelling transmission of the acknowledgment for the first uplink transmission.

Optionally, in any of the preceding aspects, another implementation of the aspect provides that the programming further includes instructions for: transmitting scheduling information for a second uplink transmission to the user equipment with a second beam, the second uplink transmission being a follow-up transmission for the first uplink transmission; receiving a first transmission of the second uplink transmission from the user equipment; scheduling an acknowledgment for the second uplink transmission; and transmitting the acknowledgment for the second uplink transmission to the user equipment with the second beam. Optionally, in any of the preceding aspects, another implementation of the aspect provides that the scheduling information for the first uplink transmission is transmitted using a first control channel, and the scheduling information for the second uplink transmission is transmitted using a second control channel. Optionally, in any of the preceding aspects, another implementation of the aspect provides that the indication includes an index for the second beam. Optionally, in any of the preceding aspects, another implementation of the aspect provides that the first uplink transmission is a hybrid automatic repeat request (HARQ) uplink transmission.

According to one aspect of the present disclosure, there is provided a base station that includes: a processor; and a non-transitory computer readable storage medium storing programming for execution by the processor, the programming including instructions for: transmitting scheduling information for a first uplink transmission to a user equipment with a first beam, the first uplink transmission scheduled at a first scheduled time; receiving a first transmission of the first uplink transmission from the user equipment at the first scheduled time; scheduling an acknowledgment for the first uplink transmission at a second scheduled time, the second scheduled time being a first predetermined amount of time after receiving the first uplink transmission; receiving an indication from the user equipment that a transmission path for the first beam between the base station and the user equipment is blocked, the indication received before the second scheduled time; based on the received indication, waiting until the second scheduled time; and after the second scheduled time, transmitting the acknowledgment to the user equipment with a second beam.

Optionally, in any of the preceding aspects, another implementation of the aspect provides that the acknowledgment is transmitted to the user equipment a second predetermined amount of time after the second scheduled time. Optionally, in any of the preceding aspects, another implementation of the aspect provides that the indication includes an index for the second beam. Optionally, in any of the preceding aspects, another implementation of the aspect provides that the first uplink transmission is a hybrid automatic repeat request (HARQ) uplink transmission.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of embodiments of this disclosure are discussed in detail below. It should be appreciated, however, that the concepts disclosed herein can be embodied in a wide variety of specific contexts, and that the specific embodiments discussed herein are merely illustrative and do not serve to limit the scope of the claims. Further, it should be understood that various changes, substitutions and alterations can be made herein without departing from the spirit and scope of this disclosure as defined by the appended claims.

In wireless networks, a UE and a base station may use beamforming such that the UE and base station communicate over a pair of beams that meet a desired criterion, e.g., low noise levels, high throughput levels, etc. As used herein, the term "beam" refers to a set of beamforming weights (e.g., amplitude/phase shifts for antenna elements of a phased array antenna) that are used for directional signal transmission and/or reception. Beamforming may typically be performed by both the base station and the UE in order to achieve commercially acceptable levels of throughput and range over higher carrier frequencies.

During beam-based transmissions, a beam failure may happen due to beam blockage, UE rotation, UE displacement, or the like. Improving beam failure recovery mechanisms may improve the performance of HF links. In accordance with some embodiments, a mechanism for acknowledgement of data reception when a BFRR is received from a gNB is disclosed. In particular, the transmission timing of HARQ ACK/NACK frames is adjusted in response to data reception. The gNB adjusts transmission timings (e.g., modifies transmission) of HARQ ACKs/NACKs in response to receiving a UE's BFRR. The BFRR may indicate a UE's new preferred beam by including a new beam index. The gNB uses the UE's suggested new beam when transmitting the HARQ ACK/NACK at the adjusted time.

Figure 1:
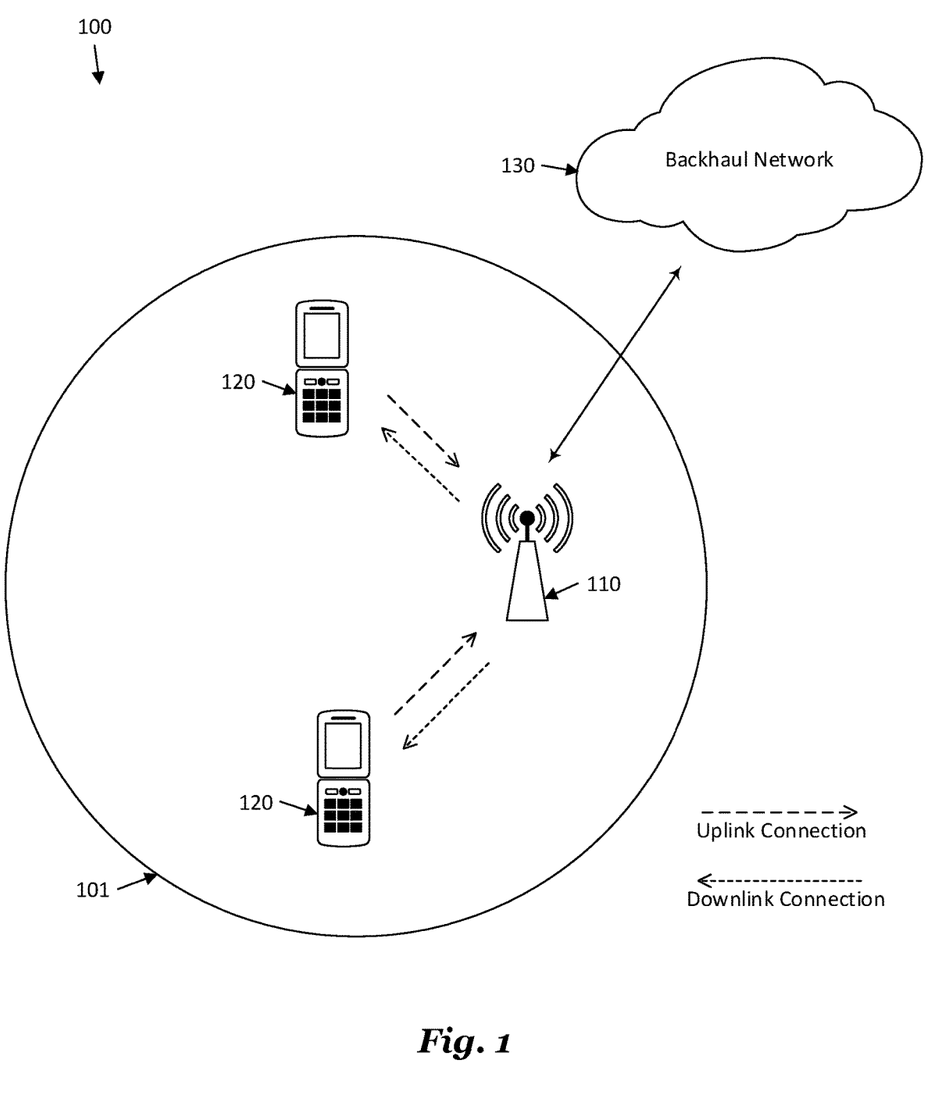
FIG. 1 is a diagram of a network for communicating data, in accordance with some embodiments.

FIG. 1 is a diagram of a network 100 for communicating data. The network 100 comprises a base station 110 having a coverage area 101, a plurality of mobile devices 120, and a backhaul network 130. As shown, the base station 110 establishes uplink (dashed line) and/or downlink (dotted line) connections with the mobile devices 120, which serve to carry data from the mobile devices 120 to the base station 110 and vice-versa. Data carried over the uplink/downlink connections may include data communicated between the mobile devices 120, as well as data communicated to/from a remote-end (not shown) by way of the backhaul network 130. As used herein, the term "base station" refers to any component (or collection of components) configured to provide wireless access to a network, such as an enhanced base station (eNB), a next generation (NG) NodeB (gNB), a macro-cell, a femtocell, a Wi-Fi access point (AP), or other wirelessly enabled devices. Base stations may provide wireless access in accordance with one or more wireless communication protocols, e.g., long term evolution (LTE), LTE advanced (LTE-A), High Speed Packet Access (HSPA), Wi-Fi 802.11a/b/g/n/ac, etc. As used herein, the term "mobile device" refers to any component (or collection of components) capable of establishing a wireless connection with a base station, such as a user equipment (UE), a mobile station (STA), and other wirelessly enabled devices. In some embodiments, the network 100 may comprise various other wireless devices, such as relays, low power nodes, etc. As used herein, the mobile devices 120 may alternative be referred to as UEs 120, and the base station 110 may alternative be referred to as a gNB 110.

Several channels may be used for BFRR transmission in the network 100. In some embodiments, a non-contention based channel is used for BFRR transmission. Such a non-contention based channel may be based on or similar to the Physical Random Access Channel (PRACH), and, at least for frequency-division multiplexing (FDM), may use resources orthogonal to resources of other PRACH transmissions. In other embodiments, code division multiplexing (CDM), time-division multiplexing (TDM), or other ways of achieving orthogonality are used with other PRACH resources. Different sequences and/or formats than those used in the PRACH may be used. Retransmission behaviors for the non-contention based channel may be similar to the retransmission behavior for the PRACH. In some embodiments, the Physical Uplink Control Channel (PUCCH) is used for BFRR transmission. Beam sweeping may (or may not) be used for the PUCCH.

To monitor for a beam failure, the UEs 120 may detect a reference signal (RS) to determine whether a beam failure trigger condition has been met. An example RS is periodic channel state information (CSI)-RS for beam management. The synchronization signal (SS) block within the serving cell may be considered, in embodiments where the SS block is used in beam management. The UEs 120 identify new beams by detecting a RS for the new candidate beams.

Figure 2:
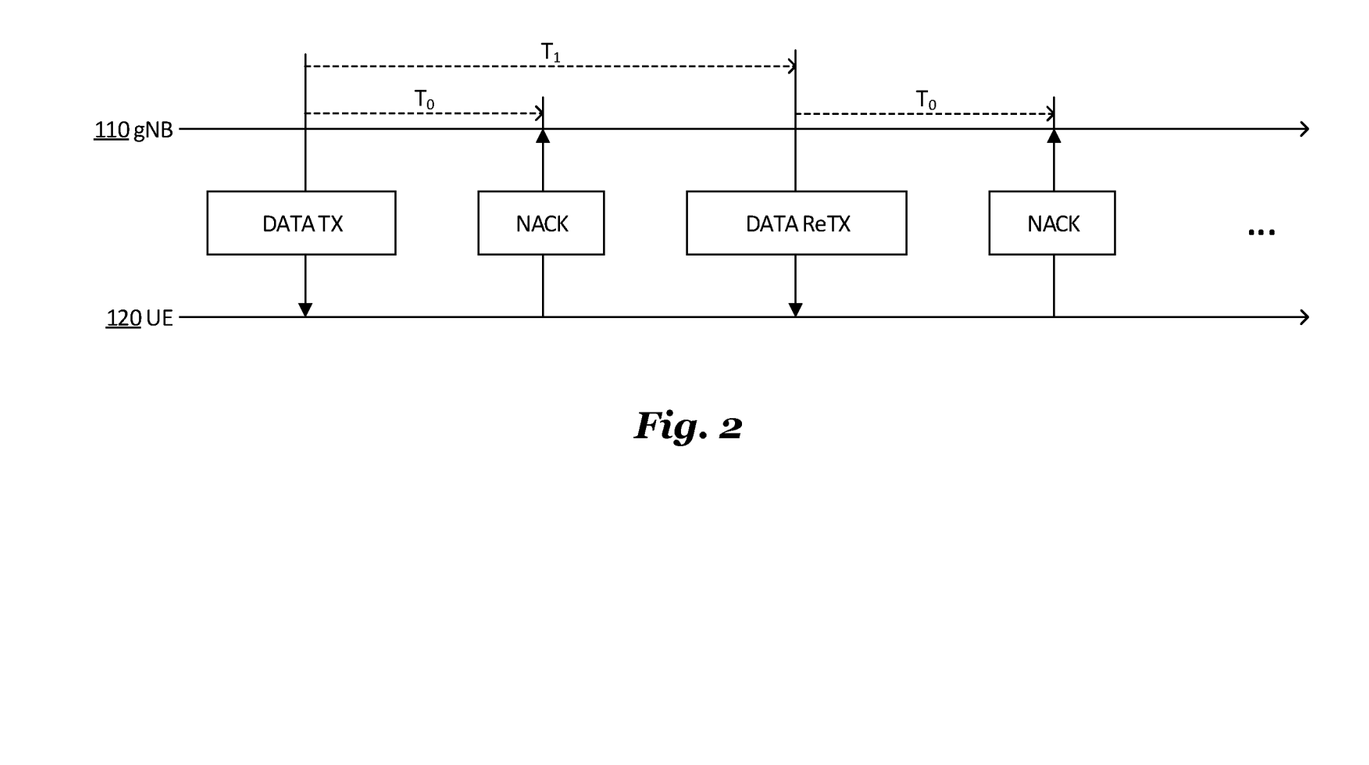
FIG. 2 illustrates an example HARQ procedure, in accordance with some embodiments.

HARQ is used by the gNB 110 and UEs 120 for robust data transmission. For example, downlink (DL) transmissions may use asynchronous HARQ, and uplink (UL) data transmissions may use synchronous HARQ, although it should be appreciated that other HARQ schemes could be used for different types of transmissions. FIG. 2 illustrates an example HARQ procedure during a DL transmission. In asynchronous HARQ, the ACK/NACK is transmitted at a fixed time ($T_0$) from receiving a data frame by a UE, and the gNB 110 determines when to perform retransmission ($T_1$) after the ACK/NACK. In synchronous HARQ, the ACK/NACK is transmitted at a fixed time ($T_0$) from receiving a data frame by the UE, and retransmission occurs at a predetermined time ($T_1$) after the ACK/NACK. If synchronous HARQ is used for UL transmissions, retransmissions may be performed unnecessarily if the beam used for HARQ ACKs/NACKs fails. According to some embodiments, if a BFRR is received during an ongoing HARQ process for a first UE 120 of the UEs 120 (e.g., during a transmission using HARQ), then the transmit beam for the ongoing HARQ process may updated according to a beam requested by the first UE 120. The requested new beam may be indicated in the BFRR by, e.g., including an index, such as a new beam index (NBI), in the BFRR. The new beam may be used for ACK/NACK, or for ACK/NACK and retransmission.

For DL transmissions using asynchronous HARQ, a beam failure occurs when no reliable DL links are available. DL data transmission failure is likely when a beam failure occurs. Further, DL control transmission may also fail when a beam failure occurs. Because the control channel includes information about the data transmission, the first UE 120 may be unable to receive scheduled DL data transmissions. As such, the first UE 120 may not send the HARQ ACK/NACK at the scheduled time when a beam failure occurs. After beam failure recovery has been processed, the gNB 110 reschedules retransmission at a new time. At that time, the DL transmissions are performed with the beam that the first UE 120 recommended, or with a beam that is determined based on beam failure recovery mechanisms or a beam management process.

For UL transmissions using synchronous HARQ, a beam failure may occur after an initial transmission from the first UE 120. For example, the first UE 120 may perform an UL transmission, and then, due to beam failure, the first UE 120 may not successfully receive a HARQ ACK/NACK response sent from the gNB 110. Ordinarily, the first UE 120 may attempt to retransmit the data packet. As the first UE 120 continues to not receive a HARQ ACK/NACK, the first UE 120 may continue attempting retransmission until a maximum or timeout value is reached. In accordance with some embodiments, after beam failure recovery has been processed, the gNB 110 may send back the HARQ ACK/NACK response to the first UE 120 using the preferred beam indicated by the NBI in the BFRR. Because the ACK/NACK response is transmitted using the preferred beam index indicated by the first UE 120, the first UE 120 may receive correct ACK/NACK information. However, the ACK/NACK response may occupy a control channel, such as the Physical Hybrid-ARQ Indicator Channel (PHICH) and/or the Physical Downlink Control Channel (PDCCH), in a physical region that is assigned for control channels (e.g., a control region), and more than one type of control information may be multiplexed in the control region. Therefore, after beam failure recovery, if the gNB 110 intends to transmit the ACK/NACK response using the preferred beam index of the first UE 120, the gNB 110 may transmit the control information in the control region using the preferred beam index of the first UE 120. Because the control region was intended for use with the previous (old) beam, if the new beam is used in the control region, then other control information destined to other UEs 120 than the first UE 120 may not be successfully received.

For example, consider a gNB 110 that uses beam index 1 for DL control channel transmission to a first UE 120. Synchronous HARQ is used for UL data transmission. When the gNB 110 initiates a UL data transmission from the first UE 120, the first UE 120 may transmit the initial data and the gNB 110 may successfully decode the data. The gNB 110 may attempt to send a HARQ ACK to the first UE 120 after a beam failure occurs. Although the first UE 120 may indicate its preferred new beam (e.g., beam index 2) by including an index in a BFRR, all control channels in a subsequent time slot may already be scheduled for beam index 1. Thus, the gNB 110 may be unable to switch its transmitting beam to beam index 2. Because the ACK is not received from the gNB 110, the first UE 120 may attempt to retransmit its data at another predetermined time. However, because the gNB 110 may have successfully received the original transmission, the retransmission is wasted.

Figure 3A:
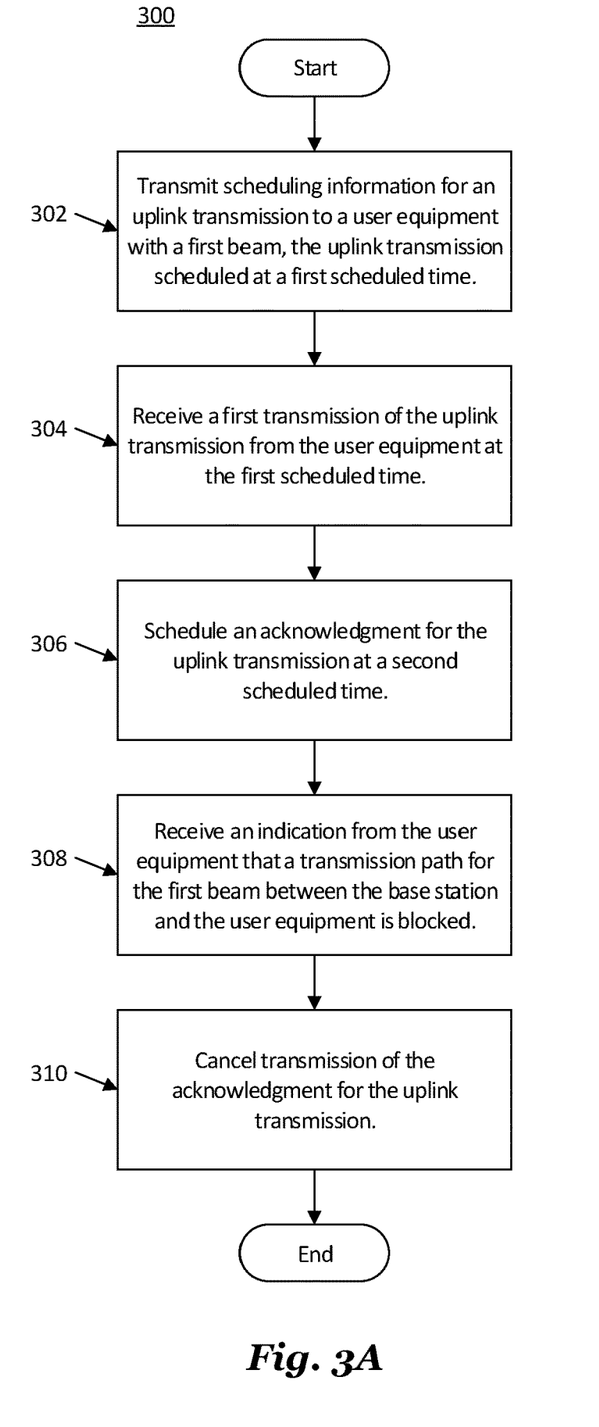
FIGS. 3A and 3B illustrate a method for performing HARQ, in accordance with some embodiments.
Figure 3B:
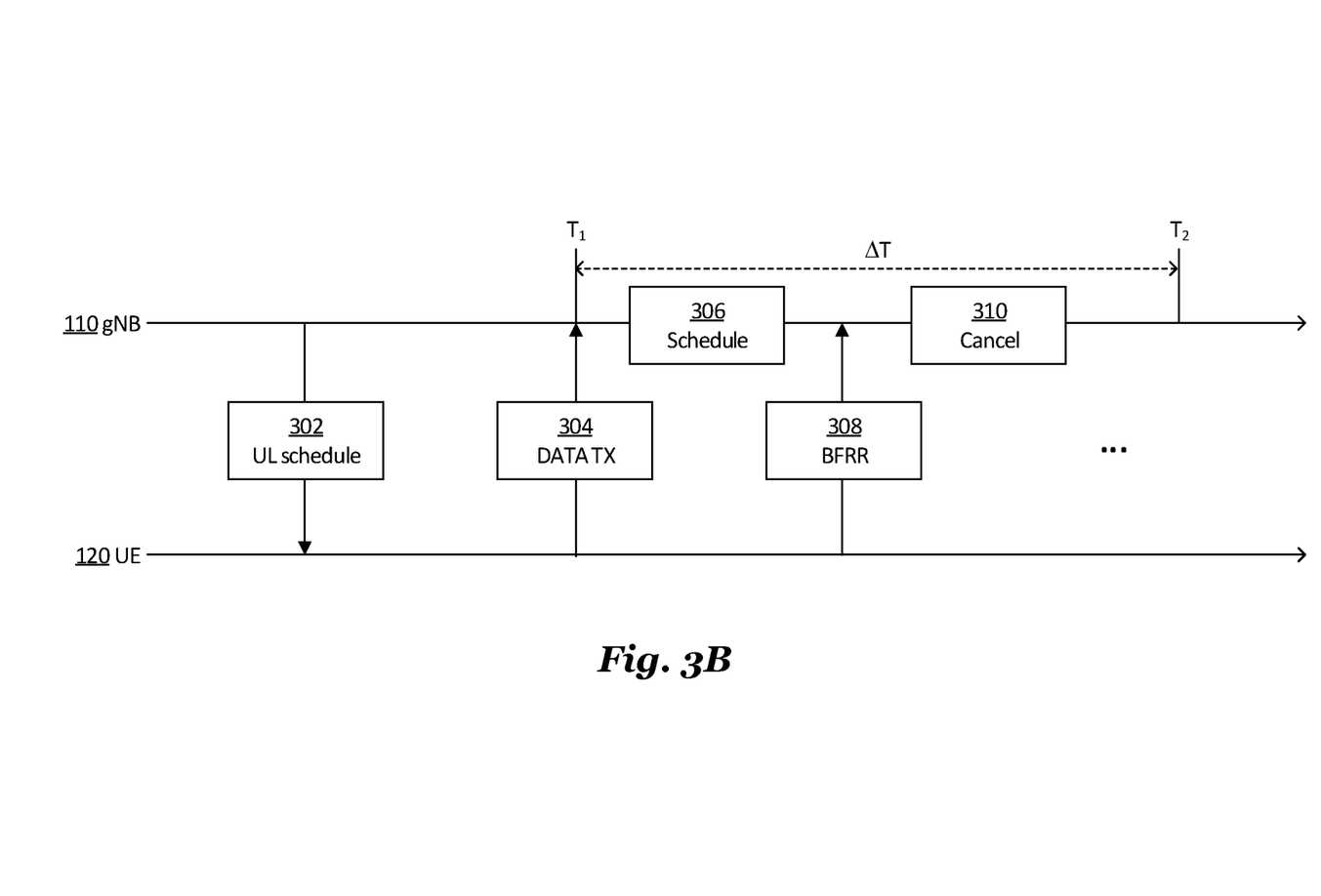

FIG. 3A illustrates a method 300 for performing HARQ during UL transmissions, in accordance with some embodiments. FIG. 3B is a protocol diagram illustrating transmission activity between the gNB 110 and UE 120 during the method 300, and is described in conjunction with FIG. 3A. In the method 300, the gNB 110 cancels remaining retransmission processes in response to receiving a BFRR during a HARQ process.

The gNB 110 transmits scheduling information for an uplink transmission to a first UE 120 with a first beam (step 302). The uplink transmission is scheduled at a first scheduled time ($T_1$). For example, the first beam may be a beam at index 1, and the scheduling information is sent using a first PDCCH for the first beam. The scheduling information includes information used by the first UE 120 to determine how to transmit (for uplink transmissions) or receive (for downlink transmissions) data packets. For example, the scheduling information may include: allocated resource elements such as frequency domain, time domain, or code resource information; the transmit methods that will be used such as the modulation and coding scheme (MCS) level or number of transmission ranks; HARQ information such as the retransmission scheme or new transmission indication; or the like. The gNB 110 receives a first transmission of the uplink transmission from the first UE 120 at the first scheduled time (step 304). The gNB 110 schedules an acknowledgment for the uplink transmission at a second scheduled time ($T_2$) (step 306). The second scheduled time ($T_2$) is a predetermined amount of time ($\Delta T$) after receiving the uplink transmission. $\Delta T$ is a predetermined time duration, which may be predetermined based on a standard specification or may be determined by the gNB 110 and indicated to the first UE 120 prior to the uplink transmission. The gNB 110 receives an indication from the first UE 120 that a transmission path for the first beam between the gNB 110 and the first UE 120 is blocked (step 308). The transmission path may be blocked because the first beam is obstructed, has failed, etc. The indication is received before the second scheduled time ($T_2$). The indication may be a BFRR, which may include the beam index of the new preferred beam of the first UE 120, referred to as a second beam. The gNB 110 cancels transmission of the acknowledgment for the uplink transmission (step 310). The gNB 110 may then schedule a follow-up UL transmission from the first UE 120, and transmit scheduling information for the follow-up UL transmission. For example, the second beam may be a beam at index 2, and the scheduling information is sent using a second PDCCH for the second beam. The UL transmission may then be received from the first UE 120 and an ACK/NACK may be sent using the second beam.

In some embodiments, the gNB 110 may schedule multiple UL data transmissions from the first UE 120, and transmit the scheduling information on one or more PDCCHs using the first beam. The gNB 110 may receive multiple UL data frames from the first UE 120 at each of the scheduled times (e.g., $T_1, T_2, \ldots, T_N$). The gNB 110 may then receive a BFRR from the first UE 120 indicating that the preferred beam of the first UE 120 is now the second beam. In response, the gNB 110 may cancel ACK/NACK information transmissions for all UL data transmissions in the HARQ process. The gNB 110 may then schedule follow-up UL data transmissions from the first UE 120, and transmit scheduling information on one or more PDCCHs using the second beam.

In some embodiments, the gNB 110 may, after receiving the BFRR, transmit an ACK only for the current UL transmission (e.g., in step 310). Future retransmissions may be cancelled.

Figure 4A:
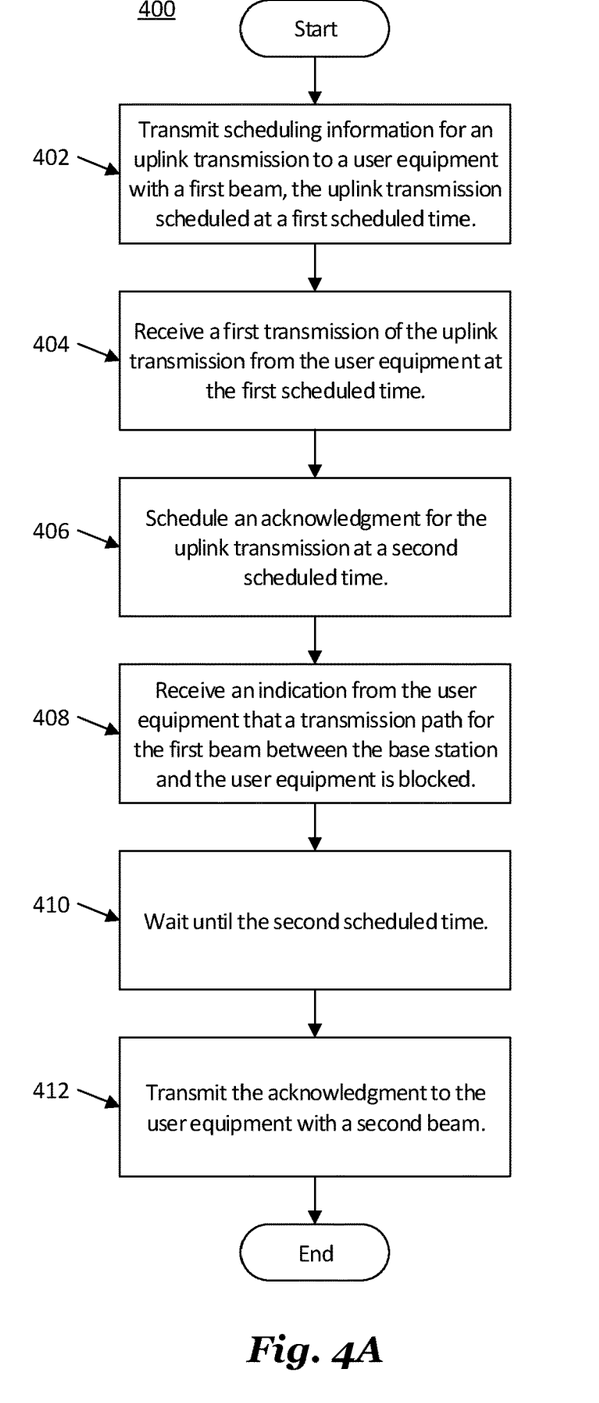
FIGS. 4A and 4B illustrate a method for performing HARQ, in accordance with some embodiments.
Figure 4B:
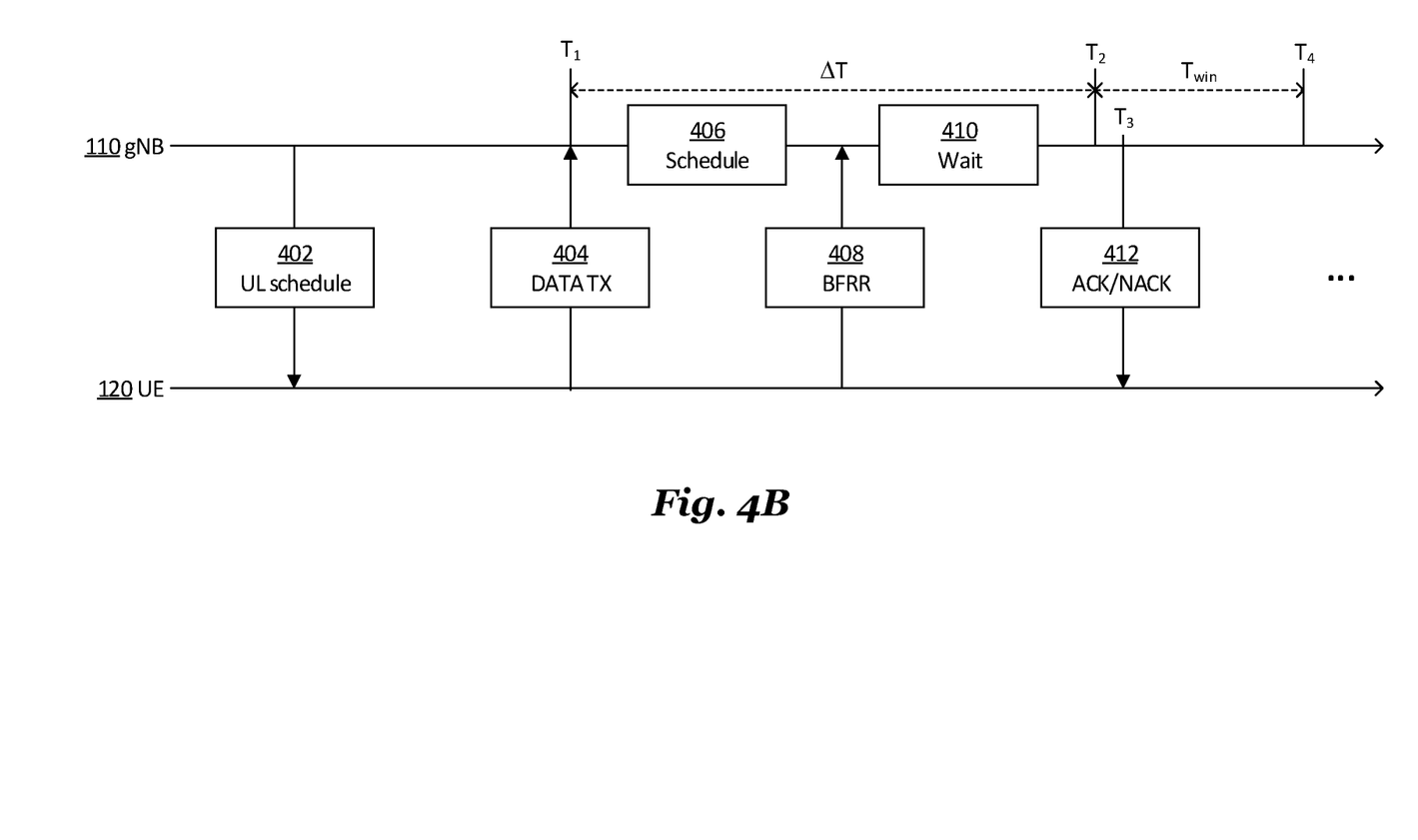

FIG. 4A illustrates a method 400 for performing HARQ during UL transmissions, in accordance with some embodiments. FIG. 4B is a protocol diagram illustrating transmission activity between the gNB 110 and UE 120 during the method 400, and is described in conjunction with FIG. 4A. In the method 400, the gNB 110 sends back an ACK/NACK response to the first UE 120 using the preferred new beam indicated by the first UE 120. In particular, the gNB 110 sends the ACK/NACK at a predetermined time after receiving a UL data transmission in response to not receiving a BFRR during a HARQ process, and the gNB 110 sends the ACK/NACK within a window from the predetermined time after receiving a UL data transmission in response to receiving a BFRR during a HARQ process.

The gNB 110 transmits scheduling information for an uplink transmission to a first UE 120 with a first beam (step 402). The uplink transmission is scheduled at a first scheduled time ($T_1$). For example, the first beam may be a beam at index 1, and the scheduling information is sent using a first PDCCH for the first beam. The gNB 110 receives a first transmission of the uplink transmission from the first UE 120 at the first scheduled time (step 404). The gNB 110 schedules an acknowledgment for the uplink transmission at a second scheduled time ($T_2$) (step 406). The second scheduled time ($T_2$) is a predetermined amount of time ($\Delta T$) after receiving the uplink transmission. The gNB 110 receives an indication from the first UE 120 that a transmission path for the first beam between the gNB 110 and the first UE 120 is blocked (step 408). The transmission path may be blocked because the first beam is obstructed, has failed, etc. The indication is received before the second scheduled time. The indication may be a BFRR, which may include the beam index of the new preferred beam of the first UE 120, referred to as a second beam. The gNB 110 waits (e.g., refrains from transmitting the acknowledgment to the first UE 120) until the second scheduled time ($T_2$) (step 410). The gNB 110 transmits the acknowledgment to the first UE 120 with the second beam (step 412). The acknowledgment is transmitted after the second scheduled time. In particular, the acknowledgment is transmitted at a time $T_3$, which is within a window ($T_{win}$) from the second scheduled time ($T_2$), e.g., $T_3$ is between $T_2$ and $T_4$, where $T_4$ is the sum of $T_2$ and $T_{win}$. $T_{win}$ is a predetermined time duration, which may be predetermined based on a standard specification or may be determined by the gNB 110 and indicated to the first UE 120 prior to the uplink transmission.

Figure 4C:
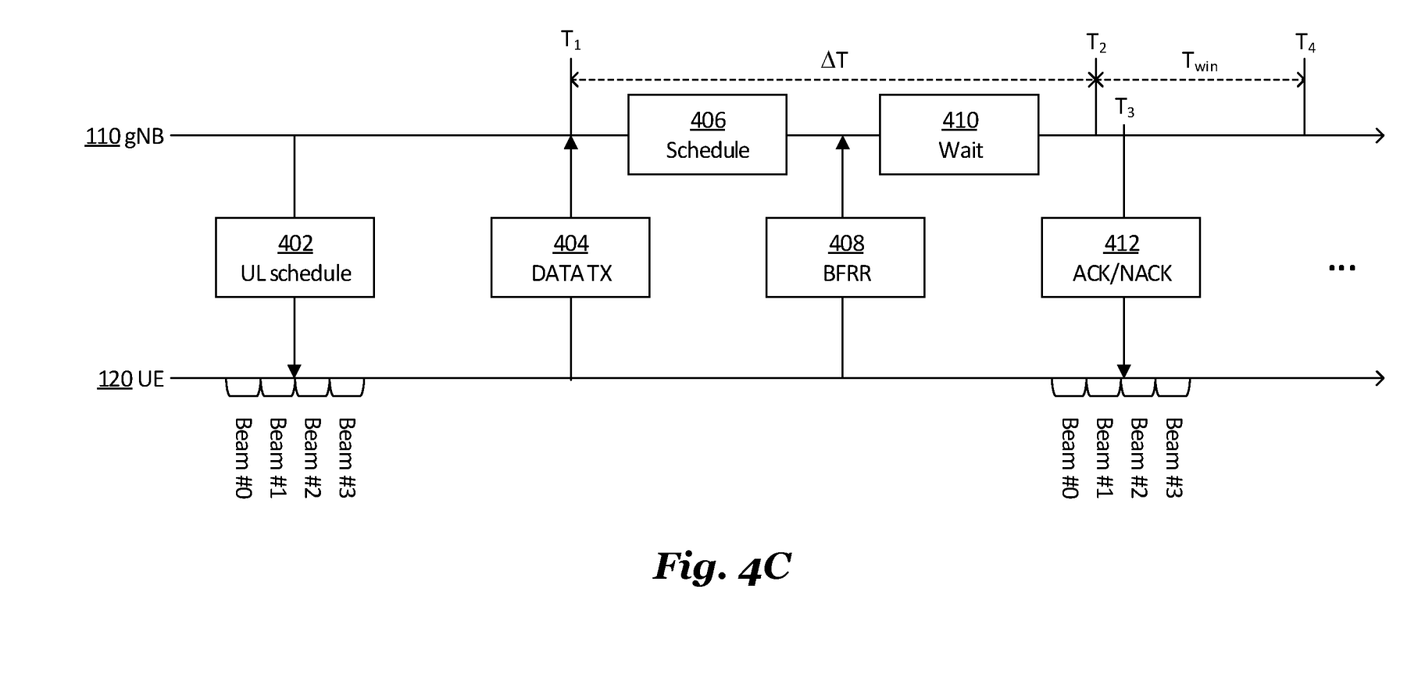
FIG. 4C illustrates a method for performing HARQ, in accordance with some embodiments.

In some embodiments, the gNB 110 uses different beams at different times for control frame transmission. For example, in FIG. 4C, the gNB 110 schedules a UL data transmission from the first UE 120 for a first scheduled time ($T_1$), and transmits the scheduling information on a control channel assigned to beam 1. The gNB 110 receives a UL data frame from the first UE 120 at the first scheduled time ($T_1$). The gNB 110 schedules an acknowledgment for the uplink transmission at a second scheduled time ($T_2$). The second scheduled time ($T_2$) is a predetermined amount of time ($\Delta T$) after receiving the uplink transmission. The gNB 110 then receives a BFRR from the first UE 120 indicating that the preferred beam of the first UE 120 is beam #2. The BFRR also indicates the transmission path for beam #1 between the base station and the first UE 120 is blocked. The gNB 110 sends the ACK/NACK information at $T_3$, where $T_3$ is a nearest time assigned for beam #2 after $T_2$.

Figure 5:
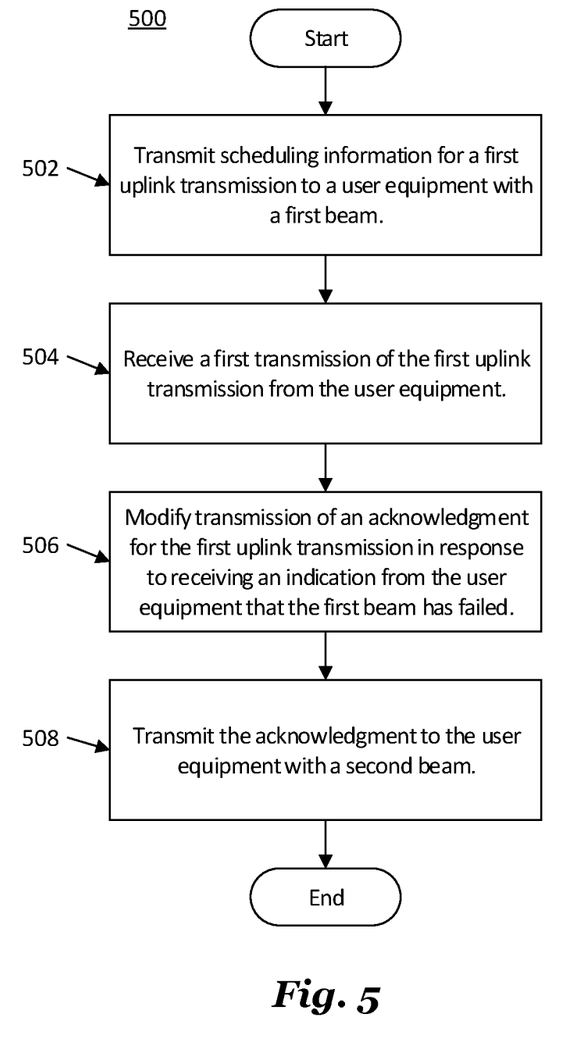
FIG. 5 illustrates a method for performing HARQ, in accordance with some embodiments.

FIG. 5 illustrates a method 500 for performing HARQ during UL transmissions, in accordance with some embodiments. The method 500 may be performed by the gNB 110. The gNB 110 transmits scheduling information for a first uplink transmission to the first user equipment 120 with a first beam (step 502). The gNB 110 receives a first transmission of the first uplink transmission from the first user equipment 120 (step 504). The gNB 110 modifies transmission of an acknowledgment for the first uplink transmission in response to receiving an indication from the first user equipment 120 that the first beam has failed (step 506). In some embodiments, modification of the transmission of the acknowledgment is accomplished by the gNB 110 cancelling transmission of the acknowledgment to the first user equipment 120. In some embodiments, modification of the transmission of the acknowledgment is accomplished by the gNB 110 delaying transmission of the acknowledgment to the first user equipment 120. The gNB 110 transmits the acknowledgment to the first user equipment 120 with a second beam (step 508). The second beam may be different from the first beam.

Embodiments may achieve advantages. Dynamically adjusting HARQ ACK/NACK responses based on UE's preferred beam may improve the wireless medium efficiency. It may also minimize or at least reduce the negative impact on control channel assigned to other UEs.

Figure 6:
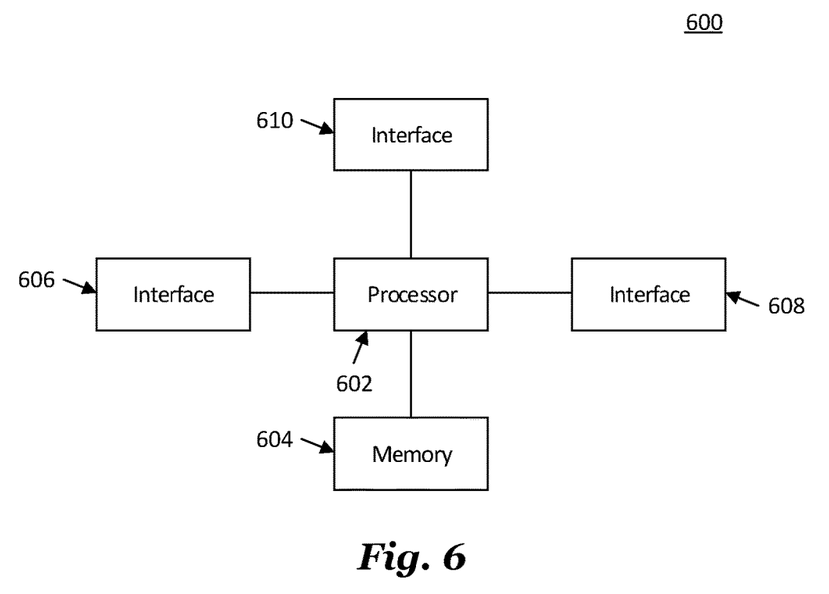
FIG. 6 is a block diagram of a processing system.

FIG. 6 is a block diagram of a processing system 600 for performing methods described herein, which may be installed in a host device. As shown, the processing system 600 includes a processor 602, a memory 604, and interfaces 606-610, which may (or may not) be arranged as shown in FIG. 6. The processor 602 may be any component or collection of components adapted to perform computations and/or other processing related tasks, and the memory 604 may be any component or collection of components adapted to store programming and/or instructions for execution by the processor 602. In an embodiment, the memory 604 includes a non-transitory computer readable medium. The interfaces 606, 608, 610 may be any component or collection of components that allow the processing system 600 to communicate with other devices/components and/or a user. For example, one or more of the interfaces 606, 608, 610 may be adapted to communicate data, control, or management messages from the processor 602 to applications installed on the host device and/or a remote device. As another example, one or more of the interfaces 606, 608, 610 may be adapted to allow a user or user device (e.g., personal computer (PC), etc.) to interact/communicate with the processing system 600. The processing system 600 may include additional components not depicted in FIG. 6, such as long term storage (e.g., non-volatile memory, etc.).

In some embodiments, the processing system 600 is included in a network device that is accessing, or part otherwise of, a telecommunications network. In one example, the processing system 600 is in a network-side device in a wireless or wireline telecommunications network, such as a base station, a relay station, a scheduler, a controller, a gateway, a router, an applications server, or any other device in the telecommunications network. In other embodiments, the processing system 600 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 7:
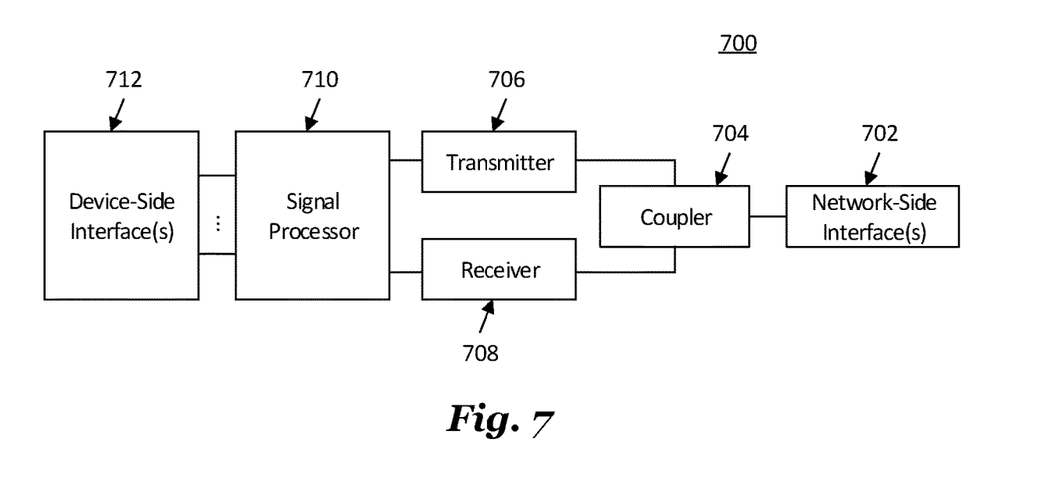
FIG. 7 is a block diagram of a transceiver.

In some embodiments, one or more of the interfaces 606, 608, 610 connects the processing system 600 to a transceiver adapted to transmit and receive signaling over the telecommunications network. FIG. 7 is a block diagram of a transceiver 700 adapted to transmit and receive signaling over a telecommunications network. The transceiver 700 may be installed in a host device. As shown, the transceiver 700 comprises a network-side interface 702, a coupler 704, a transmitter 706, a receiver 708, a signal processor 710, and a device-side interface 712. The network-side interface 702 may include any component or collection of components adapted to transmit or receive signaling over a wireless or wireline telecommunications network. The coupler 704 may include any component or collection of components adapted to facilitate bi-directional communication over the network-side interface 702. The transmitter 706 may include any component or collection of components (e.g., up-converter, power amplifier, etc.) adapted to convert a baseband signal into a modulated carrier signal suitable for transmission over the network-side interface 702. The receiver 708 may include any component or collection of components (e.g., down-converter, low noise amplifier, etc.) adapted to convert a carrier signal received over the network-side interface 702 into a baseband signal. The signal processor 710 may include any component or collection of components adapted to convert a baseband signal into a data signal suitable for communication over the device-side interface(s) 712, or vice-versa. The device-side interface(s) 712 may include any component or collection of components adapted to communicate data-signals between the signal processor 710 and components within the host device (e.g., the processing system 600, local area network (LAN) ports, etc.).

The transceiver 700 may transmit and receive signaling over any type of communications medium. In some embodiments, the transceiver 700 transmits and receives signaling over a wireless medium. For example, the transceiver 700 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 702 comprises one or more antenna/radiating elements. For example, the network-side interface 702 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 700 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by a modifying unit/module, a cancelling unit/module, a delaying unit/module, a scheduling unit/module, and/or a waiting unit/module. The respective units/modules may be hardware, software, or a combination thereof. For instance, one or more of the units/modules may be an integrated circuit, such as field programmable gate arrays (FPGAs) or application-specific integrated circuits (ASICs).

The disclosure has been described in conjunction with various embodiments. However, other variations and modifications to the disclosed embodiments can be understood and effected from a study of the drawings, the disclosure, and the appended claims, and such variations and modifications are to be interpreted as being encompassed by the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate, preclude or suggest that a combination of these measures cannot be used to advantage. A computer program may be stored or distributed on a suitable medium, such as an optical storage medium or a solid-state medium supplied together with, or as part of, other hardware, but may also be distributed in other forms, such as via the Internet or other wired or wireless telecommunication systems.

While the embodiments have been described with reference to illustrative embodiments, this description is not intended to be construed in a limiting sense. Various modifications and combinations of the illustrative embodiments, as well as other embodiments, will be apparent to persons skilled in the art upon reference to the description. It is therefore intended that the appended claims encompass any such modifications or embodiments.

What is claimed:

1. A method comprising:
    transmitting, by a base station to a user equipment using a first beam, scheduling information for a first uplink data transmission, the first uplink data transmission scheduled at a first scheduled time;
    receiving, by the base station, a first transmission of the first uplink data transmission from the user equipment at the first scheduled time;
    scheduling, by the base station, an acknowledgment for the first uplink data transmission at a second scheduled time, the second scheduled time being a predetermined amount of time after receiving the first uplink data transmission, and the acknowledgement indicating that the first transmission is successful;
    receiving, by the base station, an indication from the user equipment that a transmission path for the first beam between the base station and the user equipment is blocked, the indication received before the second scheduled time; and
    based on the received indication, cancelling, by the base station, the scheduled transmission of the acknowledgment for the first uplink data transmission.

2. The method of claim 1, further comprising:
    transmitting, by the base station, scheduling information for a second uplink data transmission to the user equipment using a second beam, the second uplink data transmission being a follow-up transmission for the first uplink data transmission;
    receiving, by the base station, a first transmission of the second uplink data transmission from the user equipment;
    scheduling, by the base station, an acknowledgment for the second uplink data transmission; and
    transmitting, by the base station, the acknowledgment for the second uplink data transmission to the user equipment using the second beam.

3. The method of claim 2, wherein the scheduling information for the first uplink data transmission is transmitted using a first control channel, and the scheduling information for the second uplink data transmission is transmitted using a second control channel.

4. The method of claim 2, wherein the indication includes an index for the second beam.

5. The method of claim 2, wherein the acknowledgment is a hybrid automatic repeat request (HARQ) downlink transmission.

6. A method comprising:
    transmitting, by a base station to a user equipment using a first beam, scheduling information for a first uplink data transmission, the first uplink data transmission scheduled at a first scheduled time;
    receiving, by the base station, a first transmission of the first uplink data transmission from the user equipment at the first scheduled time;
    scheduling, by the base station, a negative acknowledgment for the first uplink data transmission at a second scheduled time, the second scheduled time being a first predetermined amount of time after receiving the first uplink data transmission, and the negative acknowledgement indicating that the first transmission is successful;

receiving, by the base station, an indication from the user equipment that a transmission path for the first beam between the base station and the user equipment is blocked, the indication received before the second scheduled time; and based on the received indication, cancelling, by the base station, the scheduled transmission of the negative acknowledgment for the first uplink data transmission.

7. The method of claim 6, wherein the negative acknowledgment is a hybrid automatic repeat request (HARQ) downlink transmission.

8. A base station comprising:
a processor; and
a non-transitory computer readable storage medium storing programming for execution by the processor, the programming including instructions for:
   transmitting, to a user equipment using a first beam, scheduling information for a first uplink data transmission, the first uplink data transmission scheduled at a first scheduled time;
   receiving a first transmission of the first uplink data transmission from the user equipment at the first scheduled time;
   scheduling an acknowledgment for the first uplink data transmission at a second scheduled time, the second scheduled time being a predetermined amount of time after receiving the first uplink data transmission, and the acknowledgement indicating that the first transmission is successful;
   receiving an indication from the user equipment that a transmission path for the first beam between the base station and the user equipment is blocked, the indication received before the second scheduled time; and
   based on the received indication, cancelling the scheduled transmission of the acknowledgment for the first uplink data transmission.

9. The base station of claim 8, wherein the programming further includes instructions for:
   transmitting scheduling information for a second uplink data transmission to the user equipment using a second beam, the second uplink data transmission being a follow-up transmission for the first uplink data transmission;
   receiving a first transmission of the second uplink data transmission from the user equipment;
   scheduling an acknowledgment for the second uplink data transmission; and
   transmitting the acknowledgment for the second uplink data transmission to the user equipment using the second beam.

10. The base station of claim 9, wherein the scheduling information for the first uplink data transmission is transmitted using a first control channel, and the scheduling information for the second uplink data transmission is transmitted using a second control channel.

11. The base station of claim 9, wherein the indication includes an index for the second beam.

12. The base station of claim 9, wherein the acknowledgment is a hybrid automatic repeat request (HARQ) downlink transmission.

13. A base station comprising:
a processor; and
a non-transitory computer readable storage medium storing programming for execution by the processor, the programming including instructions for:
   transmitting, to a user equipment using a first beam, scheduling information for a first uplink data transmission, the first uplink data transmission scheduled at a first scheduled time;
   receiving a first transmission of the first uplink data transmission from the user equipment at the first scheduled time;
   scheduling a negative acknowledgment for the first uplink data transmission at a second scheduled time, the second scheduled time being a first predetermined amount of time after receiving the first uplink data transmission, and the negative acknowledgement indicating that the first transmission is successful;
   receiving an indication from the user equipment that a transmission path for the first beam between the base station and the user equipment is blocked, the indication received before the second scheduled time; and
   based on the received indication, cancelling the scheduled transmission of the negative acknowledgment for the first uplink data transmission.

14. The base station of claim 13, wherein the negative acknowledgment is a hybrid automatic repeat request (HARQ) downlink transmission.

15. The method of claim 6, further comprising:
   transmitting, by the base station, scheduling information for a second uplink data transmission to the user equipment using a second beam, the second uplink data transmission being a follow-up transmission for the first uplink data transmission;
   receiving, by the base station, a first transmission of the second uplink data transmission from the user equipment;
   scheduling, by the base station, a negative acknowledgment for the second uplink data transmission; and
   transmitting, by the base station, the negative acknowledgment for the second uplink data transmission to the user equipment using the second beam.

16. The method of claim 15, wherein the scheduling information for the first uplink data transmission is transmitted using a first control channel, and the scheduling information for the second uplink data transmission is transmitted using a second control channel.

17. The method of claim 15, wherein the indication includes an index for the second beam.

18. The base station of claim 13, wherein the programming further includes instructions for:
   transmitting scheduling information for a second uplink data transmission to the user equipment using a second beam, the second uplink data transmission being a follow-up transmission for the first uplink data transmission;
   receiving a first transmission of the second uplink data transmission from the user equipment;
   scheduling a negative acknowledgment for the second uplink data transmission; and
   transmitting the negative acknowledgment for the second uplink data transmission to the user equipment using the second beam.

19. The base station of claim 18, wherein the scheduling information for the first uplink data transmission is transmitted using a first control channel, and the scheduling information for the second uplink data transmission is transmitted using a second control channel.

20. The base station of claim 18, wherein the indication includes an index for the second beam.

* * * * *